US008659527B2

(12) United States Patent
Kuo et al.

(10) Patent No.: US 8,659,527 B2
(45) Date of Patent: Feb. 25, 2014

(54) ACTIVE DEVICE ARRAY SUBSTRATE

(75) Inventors: Po-Hung Kuo, Taipei (TW); Chih-Ho Lien, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 175 days.

(21) Appl. No.: 13/298,306

(22) Filed: Nov. 17, 2011

(65) Prior Publication Data

US 2013/0057459 A1 Mar. 7, 2013

(30) Foreign Application Priority Data

Sep. 1, 2011 (TW) .............................. 100131532 A

(51) Int. Cl.
*G09G 3/36* (2006.01)
(52) U.S. Cl.
USPC ................. 345/90; 345/76; 345/87; 345/204; 345/690
(58) Field of Classification Search
USPC .................................... 345/76–100, 204, 690
See application file for complete search history.

(56) References Cited

U.S. PATENT DOCUMENTS

| | | | |
|---|---|---|---|
| 2005/0206798 A1* | 9/2005 | Kim ................................ 349/54 |
| 2006/0114216 A1* | 6/2006 | Shim ............................. 345/100 |
| 2012/0092308 A1* | 4/2012 | Chiang et al. ................. 345/204 |
| 2012/0194566 A1* | 8/2012 | Lan et al. ...................... 345/690 |

* cited by examiner

*Primary Examiner* — Jennifer Nguyen
(74) *Attorney, Agent, or Firm* — Jianq Chyun IP Office

(57) ABSTRACT

An active device array substrate including a substrate, a plurality of pixel structures and a plurality of resistance compensating devices is provided. The substrate has a display region and a scanning signal input region beside the display region. The pixel structures are disposed in the display region. Each of the pixel structures includes a scan line, a data line, an active device and a pixel electrode. The data line is disposed in stagger with the scan line. The active device is electrically connected with the scan line and the data line. The pixel electrode is electrically connected with the active device. Each of the resistance compensating devices and a scan line of a corresponding pixel structure are connected in parallel. Resistances of the resistance compensating devices gradually decrease from a region close to the scanning signal input region to another region away the scanning signal input region.

8 Claims, 2 Drawing Sheets

ACTIVE DEVICE ARRAY SUBSTRATE

CROSS-REFERENCE TO RELATED APPLICATION

This application claims the priority benefit of Taiwan application serial no. 100131532, filed on Sep. 1, 2011. The entirety of the above-mentioned patent application is hereby incorporated by reference herein and made a part of this specification.

BACKGROUND OF THE INVENTION

1. Field of the Invention

The invention relates to an active device array substrate and a display panel. More particularly, the invention relates to an active device array substrate having a resistance compensating device and a display panel having a resistance compensating device.

2. Description of Related Art

Flat display panels have low consumption power, high space utilization efficiency, high image quality, and are free of radiation, and thus have become the mainstream in the market. With the progression in display technology, consumers not only have high demands in optical properties of flat display panels, such as viewing angle, contrast ratio, and response time, but also have increasing demands for large size display panels with the booming economy.

As the size of display panels increases, the length of the scan lines in the display regions of the display panels also increases. Furthermore, consumers have higher demands for the resolution of displays (e.g. Full HD is applied in the digital television system of many countries, where the resolution thereof is 1920*1080 PPI). Without altering the configuration size of display panels, designers have to reduce the line width of the scan line to create space for the accommodation of the pixels increased to attain the number of pixels required for the new system (e.g. Full HD). These two factors result in increasing resistance of the scan lines, such that the scanning signals are distorted when transmitting on the scan lines, thereby leading to deterioration of display quality, for example, insufficient pixel charging time, low brightness, color shift, and image flickering.

SUMMARY OF THE INVENTION

Accordingly, the invention is directed to an active device array substrate capable of improving the deteriorated display quality caused by the increasing resistance of scan lines in the conventional art.

The invention is directed to a display panel capable of improving the deteriorated display quality caused by the increasing resistance of scan lines in the conventional art.

The invention is directed to an active device array substrate including a substrate, a plurality of pixel structures, and a plurality of resistance compensating devices. The substrate has a display region and a scanning signal input region beside the display region. The pixel structures are disposed in the display region of the substrate. Each of the pixel structures includes a scan line, a data line, an active device, and a pixel electrode. The data line is disposed in stagger with the scan line. The active device is electrically connected to the scan line and the data line. The pixel electrode is electrically connected to the active device. Each of the resistance compensating devices and a scan line of a corresponding pixel structure are connected in parallel. A plurality of resistances of the resistance compensating devices decreases gradually from a region close to the scanning signal input region to a region away from the scanning signal input region.

The invention is directed to a display panel including the active device array substrate, an opposite substrate, and a display medium. The opposite substrate is opposite to the active device array substrate. The display medium is sandwiched between the active device array substrate and the opposite substrate.

According to an embodiment of the invention, each of the resistance compensating devices includes a conductive line segment and a plurality of contact structures. The contact structures are electrically connected to the conductive line segment and a corresponding scan line.

According to an embodiment of the invention, each of the resistance compensating devices is disposed above the scan line.

According to an embodiment of the invention, each of the resistance compensating devices is overlapped with the scan line.

According to an embodiment of the invention, a length of the conductive line segment increases gradually from the region close to the scanning signal input region to the region away from the scanning signal input region.

According to an embodiment of the invention, each of the pixel structures connected in parallel with the corresponding scan line has a structure including an insulating layer and a protection layer. The insulating layer is disposed between the scan line and the conductive line segment. The protection layer covers the conductive line segment. The protection layer has an opening for exposing the conductive line segment. The contact structures penetrate the insulating layer and the protection layer so as to electrically contact the scan line of the corresponding pixel structure. The contact structure electrically contacts with the conductive line segment through the opening.

According to an embodiment of the invention, the contact structure and the pixel electrode are fabricated using the same material.

According to an embodiment of the invention, the conductive line segment and the data lines are fabricated using the same material.

According to an embodiment of the invention, the pixel structures are arranged in columns and rows, and the resistances of the resistance compensating devices of the pixel structures disposed in the same column are substantially the same.

According to an embodiment of the invention, the resistance compensating devices are not disposed in the pixel structures in the column closest to the scanning signal input region.

In the active device array substrate and the display panel of the invention, the resistances of the resistance compensating devices gradually decrease from the region close to the scanning signal input region to the region away from the scanning signal input region, so that the resistance generated from the scan line of each pixel structure and the resistance compensating device electrically connected in parallel gradually decreases as the resistance compensating device is farther away from the scanning signal input region. As a result, the distortion of the scanning signals caused by the increasing resistance of the scan lines as the scan lines are farther away from the scanning signal input region in the conventional art is improved. Also, the deterioration of display quality is improved at the same time.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

DESCRIPTION OF EMBODIMENTS

Figure 1A:
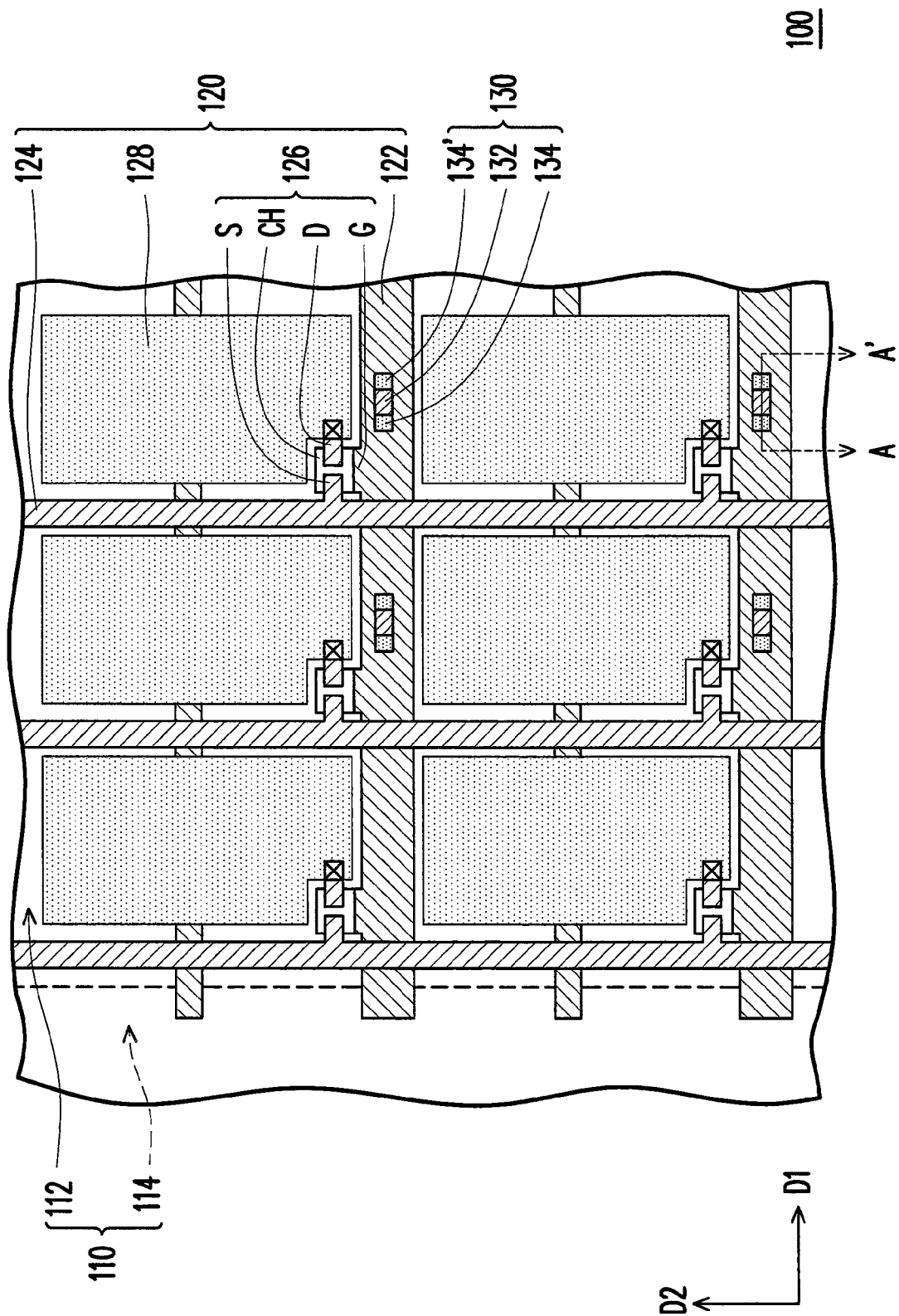
FIG. 1A is a schematic top view showing an active device array substrate according to one embodiment of the invention.

FIG. 1A is a schematic top view showing an active device array substrate according to one embodiment of the invention. Referring to FIG. 1A, an active device array substrate 100 of the present embodiment includes a substrate 110, a plurality of pixel structures 120, and a plurality of resistance compensating devices 130. The substrate 110 of the present embodiment has a display region 112 and a scanning signal input region 114 beside the display region 112. For example, the display region 112 is a rectangular region and the scanning signal input region 114 is a smaller rectangular region located on the left side of the display region 112. It should be noted that the scanning signal input region 114 of the present embodiment is suitable for disposing a scanning signal source, for instance, a scanning signal chip. The scanning signal source sends out a scanning signal to the pixel structure 120 through a scan line 122 of each of the pixel structures 120. In the present embodiment, the substrate 110 is fabricated with glass, quartz, an organic polymer, an opaque/reflective material (i.e. conductive material, wafer, ceramics, and so on), or other suitable materials.

The pixel structure 120 of the present embodiment is located in the display region 112 of the substrate 110. Each of the pixel structures 120 includes a scan line 122, a data line 124, an active device 126, and a pixel electrode 128. In the present embodiment, the scan line 122 and the data line 124 are disposed in stagger. For example, the scan line 122 extends along an row direction D1 and the data line 124 extends along a column direction D2. The scan line 122 and the data line 124 of the present embodiment are in different layers. In details, the data line 124 of the present embodiment is disposed in a layer above the scan line 122. In the present embodiment, the scan line 122 and the data line 124 are usually fabricated using a metal material. However, the invention is not limited thereto, in other embodiments, the scan line 122 and the data line 124 can also be fabricated using other conductive materials such as an alloy, a nitride of a metal material, an oxide of a metal material, an oxynitride of a metal material, or a stacked layer of a metal material and other conductive materials.

The active device 126 of the present embodiment is electrically connected to the scan line 122 and the data line 124. For instance, the active device 126 of the present embodiment is a thin film transistor (TFT). Furthermore, the active device 126 of the present embodiment is a bottom gate TFT. Specifically, the active device 126 of the present embodiment includes a gate G, a channel layer CH located on the gate G, a source S and a drain D respectively covering two sides of the channel layer CH. Here, the gate G of the active device 126 is electrically connected to the scan line 122 in the same layer, and the source S of the active device 126 is electrically connected to the data line 124 in another layer. In other words, the source S, the drain D, and the data line 124 are in the same layer. Nonetheless, the invention is not limited thereto. In other embodiments, the active device 126 can also be a top gate TFT or other active devices of suitable types.

The pixel electrode 128 is electrically connected to the active device 126 in the present embodiment. In details, the pixel electrode 128 is electrically connected to the drain D of the active device 126 in the present embodiment. In the present embodiment, the pixel electrode 128 is, for example, a transparent conductive layer including a metal oxide, for example, indium tin oxide (ITO), indium zinc oxide (IZO), aluminum tin oxide (ATO), aluminum zinc oxide (AZO), indium germanium zinc oxide (IGZO), other suitable oxides, or a stacked layer of at least two of the above.

Figure 1B:
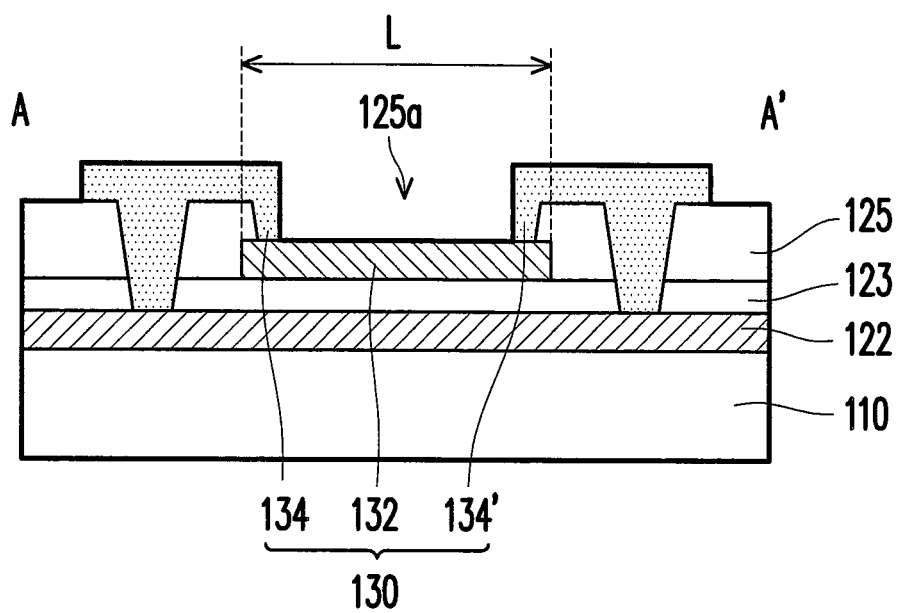
FIG. 1B is a schematic cross-sectional view taken along line AA' in FIG. 1A.

FIG. 1B is a schematic cross-sectional view taken along line AA' in FIG. 1A. Referring to FIGS. 1A and 1B simultaneously, each of the resistance compensating devices 130 of the present embodiment is connected in parallel with the scan line 122 of the corresponding pixel structure 120. Further, each of the resistance compensating devices 130 in the present embodiment includes a conductive line segment 132 and a plurality of contact structures 134, 134'. The contact structures 134, 134' are electrically connected to the conductive line segment 132 and the corresponding scan line 122 respectively, so that the resistance compensating device 130 and the scan line 122 are connected in parallel. In details, each of the pixel structures 120 further includes an insulating layer 123 and a protection layer 125. The insulating layer 123 is disposed between the scan line 122 and the conductive line segment 132. The protection layer 125 covers the conductive line segment 132. The protection layer 125 has an opening 125a exposing the conductive line segment 132. One end of the contact structure 134 and one end of the contact structure 134' penetrate the insulating layer 123 and the protection layer 125 respectively so as to electrically contact with the corresponding scan line 122. The other end of the contact structure 134 and the other end of the contact structure 134' electrically contact with the conductive line segment 132 through the opening 125a respectively. In other words, the conductive line segment 132 of the resistance compensating device 130 is connected with the scan line 122 in parallel through the contact structures 134, 134'.

It should be noted that in the present embodiment, the conductive line segment 132 of the resistance compensating device 130 and the data line 124 are fabricated with the same material, and the contact structures 134, 134' and the pixel electrode 128 are fabricated with the same material. In other words, the conductive line segment 132 of the resistance compensating device 130 and the data line 124 are in the same layer and fabricated in the same fabrication process, where it's vice versa for the contact structures 134, 134' and the pixel electrode 128. That is, the fabrication of the resistance compensating devices 130 of the present embodiment is compatible with the conventional fabrication and does not increase the fabrication cost of the active device array substrate 100. In the present embodiment, the conductive line segment 132 and the data line 124 are fabricated with a metal material. However, the invention is not limited thereto. According to other embodiments, the conductive line segment 132 and the data line 124 can also be fabricated using other conductive materials. The conductive materials aforementioned include, for example, an alloy, a nitride of a metal material, an oxide of a metal material, an oxynitride of a metal material, or a stacked layer of a metal material and other conductive materials. In the present embodiment, the contact structures 134, 134' and the pixel electrode 128 are, for example, fabricated with a metal oxide, for example, ITO, IZO, ATO, AZO, IGZO, or other suitable oxides, or a stacked layer of at least two of the above.

Further, the resistance compensating device 130 of the present embodiment is disposed above the scan line 122 and overlapped with the scan line 122. Accordingly, the resistance compensating device 130 of the present embodiment does not result in the additional decrease of the aperture ratio of the active device array substrate 100. Consequently, display panels adopting the active device array substrate 100 of the present embodiment have superior display property.

It should be noted that each resistance compensating device 130 in the present embodiment is connected to the scan line 122 of the corresponding pixel structure 120 in parallel. The resistances of the resistance compensating devices 130 also decrease gradually from the region close to the scanning signal input region 114 to the region away from the scanning signal input region 114. For instance, in the present embodiment, the resistances of the contact structures 134, 134' of each resistance compensating device 130 are equal. A length L of the conductive line segment 132 of the resistance compensating device 130 increases gradually from the region close to the scanning signal input region 114 to the region away from the scanning signal input region 114. In other words, in the active device array substrate 100 of the present embodiment, the resistances of the resistance compensating devices 130 decrease gradually from the region close to the scanning signal input region 114 to the region away from the scanning signal input region 114 as the length L of the conductive line segment 132 increases gradually from the region close to the scanning signal input region 114 to the region away from the scanning signal input region 114. Nonetheless, the invention is not limited thereto. Other suitable designing methods can also be adopted so that the resistances of the resistance compensating devices 130 decrease gradually from the region close to the scanning signal input region 114 to the region away from the scanning signal input region 114. The pixel structures 120 in the present embodiment are arranged in columns and rows, and the resistances of the resistance compensating devices 130 of the pixel structures 120 disposed in the same column are substantially the same. In addition, in the present embodiment, the pixel structures 120 located in the column closest to the scanning signal input region 114 are not disposed with the resistance compensating devices 130.

It should be noted that when each of the resistance compensating devices 130 of the present embodiment is connected with the scan line 122 of the corresponding pixel structure 120 in parallel, and the resistances of the resistance compensating devices 130 decrease gradually from the region close to the scanning signal input region 114 to the region away from the scanning signal input region 114, the deteriorated display quality caused by the increasing resistances of the scan lines in the conventional art can be improved. In details, the scan line 122 of each of the pixel structures 120 can be connected with the resistance compensating device 130 in parallel, so that the resistance generated from the scan line 122 and the resistance compensating device 130 is less than the resistance generated from the scan line 122 itself. Since the resistances of the resistance compensating devices 130 decrease gradually from the region close to the scanning signal input region 114 to the region away from the scanning signal input region 114, the resistance generated from the scan line 122 of the pixel structure 120 and the resistance compensating device 130 connected in parallel also decreases from the region close to the scanning signal input region 114 to the region away from the scanning signal input region 114. Accordingly, comparing to the conventional art, the increasing resistance generated from the total scan lines (which forms by connecting the scan lines 122 of the pixel structures 120 in the same row) as the terminal end of the total scan lines is farther away from the scanning signal input region 114 can be alleviated clearly. As a result, the deteriorated display quality caused by the increasing resistance of the scan lines (similar to the total scan lines aforementioned) in the conventional art can be improved.

Figure 2:
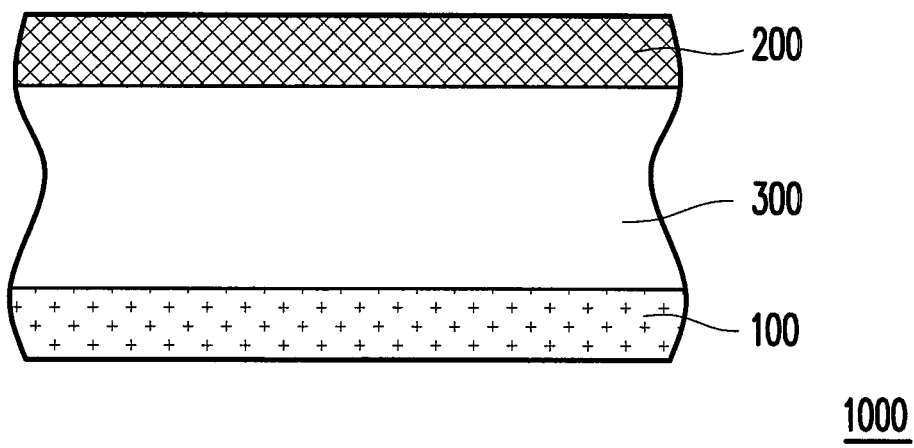
FIG. 2 is a schematic cross-sectional view illustrating a display panel according to one embodiment of the invention.

FIG. 2 is a schematic cross-sectional view illustrating a display panel according to one embodiment of the invention. Referring to FIG. 2, a display panel 1000 of the present embodiment includes the active device array substrate 100, the opposite substrate 200 opposite to the active device array substrate 100, and a display medium 300 sandwiched between the active device array substrate 100 and the opposite substrate 200. In the present embodiment, the opposite substrate 200 is, for example, a color filter substrate and the display medium 300 can be liquid crystal, an organic electroluminescent layer, an electrophoresis display medium, and so on; however, the invention is not limited thereto. The display panel 1000 of the present embodiment and the active device array substrate 100 have similar functions and advantages which are not reiterated hereinafter.

In summary, in the active device array substrate and the display panel of the invention, the resistances of the resistance compensating devices gradually decrease from the region close to the scanning signal input region to the region away from the scanning signal input region, so that the resistance generated from the scan line of each pixel structure and the resistance compensating device connected in parallel gradually decreases as the resistance compensating device is farther away from the scanning signal input region. As a result, the deteriorated display quality caused by the increasing resistance of the scan lines as the scan lines are farther away from the scanning signal input region in the conventional art is improved.

In the active device array substrate and the display panel of the invention, the conductive line segment of the resistance compensating device and the data line form simultaneously. Moreover, the contact structures in the same layer as the pixel electrode are utilized to connect the conductive line segment of each resistance compensating device and the scan line of the corresponding pixel structure in parallel. Therefore, the design of the active device array substrate and the display panel of the invention are compatible with the conventional fabrication and does not increase the fabrication cost of the active device array substrate. Furthermore, in the active device array substrate and the display panel of the invention, the resistance compensating device is disposed on the scan line of the corresponding pixel structure, such that the design of the resistance compensating device does not easily lower the aperture ratio of the active device array substrate.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An active device array substrate, comprising:
a substrate having a display region and a scanning signal input region beside the display region;
a plurality of pixel structures disposed in the display region of the substrate, each of the pixel structures comprising:
  a scan line;
  a data line disposed in stagger with the scan line;
  an active device electrically connected to the scan line and the data line;
  a pixel electrode electrically connected to the active device; and
a plurality of resistance compensating devices, each of the resistance compensating devices is electrically connected in parallel with a scan line of a corresponding pixel structure, wherein a plurality of resistances of the resistance compensating devices decrease gradually from a region close to the scanning signal input region to a region away from the scanning signal input region, wherein each of the resistance compensating devices comprises a conductive line segment and a plurality of contact structures electrically connected to the conductive line segment and a corresponding scan line, and each of the pixel structures which is electrically connected in parallel with the scan line of the corresponding pixel structure comprises an insulating layer disposed between the scan line and the conductive line segment, and a protection layer covering the conductive line segment, wherein the protection layer has an opening for exposing the conductive line segment, the contact structures penetrate the insulating layer and the protection layer so as to electrically contact the scan line of the corresponding pixel structure, and the contact structures electrically contact the conductive line segment through the opening.

2. The active device array substrate as claimed in claim 1, wherein each of the resistance compensating devices is disposed above the scan line.

3. The active device array substrate as claimed in claim 2, wherein each of the resistance compensating devices is overlapped with the scan line.

4. The active device array substrate as claimed in claim 1, wherein a length of the conductive line segment increases gradually from the region close to the scanning signal input region to the region away from the scanning signal input region.

5. The active device array substrate as claimed in claim 1, wherein the contact structure and the pixel electrode are fabricated using the same material.

6. The active device array substrate as claimed in claim 1, wherein the conductive line segment of each of the resistance compensating devices and the data lines are fabricated using the same material.

7. The active device array substrate as claimed in claim 1, wherein the pixel structures are arranged in columns and rows, and the resistances of the resistance compensating devices of the pixel structures disposed in the same column are substantially the same.

8. The active device array substrate as claimed in claim 7, wherein the resistance compensating devices are not disposed in the pixel structures in a column closest to the scanning signal input region.

* * * * *